United States Patent Office 3,436,408
Patented Apr. 1, 1969

3,436,408
DIEPOXIDE ETHERS
Hans Batzer and Erwin Nikles, Basel, Switzerland, assignors to Ciba Limited, Basel, Switzerland, a Swiss company
No Drawing. Filed Feb. 15, 1961, Ser. No. 89,374
Claims priority, application Switzerland, Feb. 25, 1960, 2,112/60
Int. Cl. C08g 22/14; C07d 1/00, 1/18
U.S. Cl. 260—348         4 Claims This invention relates to new diepoxide compounds of the formula

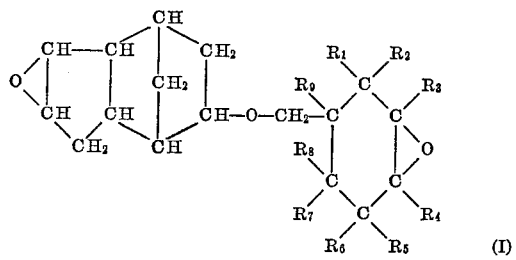

(I)

wherein each of the symbols $R_1$ to $R_9$ represents a monovalent substituent, such as a halogen atom, an alkoxy group, or an aliphatic, cycloaliphatic, araliphatic, or aromatic hydrocarbon radical, especially a lower alkyl radical, especially a lower alkyl radical having 1 to 4 carbon atoms or a hydrogen atom, and wherein $R_1$ and $R_5$ together may represent an alkylene radical, such as methylene group.

According to this invention, these new diepoxides are obtained when an unsaturated ether of the formula

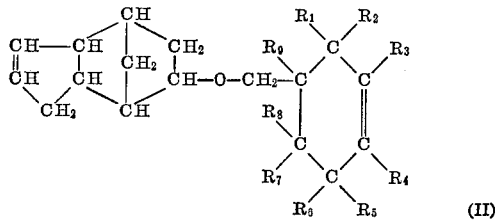

(II)

in which the symbols $R_1$ to $R_9$ have the meanings given above is treated with an epoxidizing agent.

The epoxidation of the carbon-to-carbon double bonds to form the compounds of this invention is performed in per se conventional manner, preferably with the aid of organic peracids, such as peracetic acid, perbenzoic acid, peradipic acid, monoperphthalic acid, etc. The epoxidizing agent may also be hypochlorous acid, in which case in a first reaction stage HOCl is additively combined at the double bond, and, in a second stage, the epoxide group is formed by means of an agent capable of splitting of HCl, e.g., a strong alkali.

Easiest to obtain are the diepoxide compounds of the formula

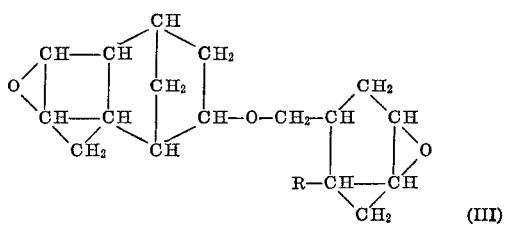

(III)

in which R represents a hydrogen atom or a lower alkyl radical, especially a methyl group.

These epoxides are clear resins which are liquid at room temperature and which can be converted by means of suitable hardeners, as e.g. dicarboxylic acid anhydrides, into clear and pale hardened products having excellent mechanical properties.

The most convenient way of obtaining the starting compounds of the Formula II consists in additively combining an alcohol of the formula

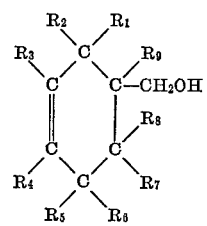

(IV)

in which the symbols $R_1$ to $R_9$ have the meanings given in connection with Formula I, with a dicyclopentadiene.

The additive combination of alcohol (IV) at one carbon-to-carbon double bond of the dicyclopentadiene is advantageously carried out in per se conventional manner in presence of an acid catalyst or Lewis acid, such as for example, sulfuric acid or boron trifluoride.

The diepoxides of this invention react with the usual hardeners for epoxide compounds. They can therefore be cross-linked or cured by the addition of such a hardener in the same manner as other polyfunctional epoxide compounds or epoxide resins. Such hardener may be a basic or especially an acid compound.

There are suitable: amines or amides, such as aliphatic and aromatic primary, secondary, and tertiary amines, e.g., mono-, di-, and tributylamine, para-phenylenediamine, bis-(para-aminophenyl)-methane, ethylene diamine, N,N-diethylethylene diamine, N,N-dimethyl-propylenediamine, diethylene triamine, tetra-(hydroxyethyl)-diethylenetriamine, triethylene tetramine, tetraethylene pentamine, dimethylamine, diethylamine, triethanolamine, Mannich bases, piperidine, piperazine, guanidine, and guanidine derivatives, such as phenyldiguanidine, diphenylguanidine, dicyandiamide, aniline-formaldehyde resins, ureaformaldehyde resins, polymers of aminostyrenes, polyamides, e.g., those from aliphatic polyamines, and di- or trimerized, unsaturated fatty acids, isocyanates, isothiocyanates; polyvalent phenols, e.g. resorcinol, hydroquinone, bis-(-4-hydroxyphenyl)-dimethylmethane, quinone, phenolaldehyde resins, oil-modified phenol aldehyde resins, reaction products of alcoholates or phenolates of aluminum with tautomeric compounds of the type of acetoacetic acid ester, Friedel-Crafts catalysts, e.g., $AlCl_3$, $SbCl_5$, $SnCl_4$, $ZnCl_2$, $BF_3$ and complexes thereof with organic compounds, phosphoric acid. Preferred hardeners are polybasic carboxylic acids and their anhydrides, e.g., phthalic acid anhydride, methylendomethylene tetrahydrophthalic acid anhydride, dodecenylsuccinic acid anhydride, hexahydrophthalic acid anhydride, hexachlorendomethylene tetrahydrophthalic acid anhydride or endomethylenetetrahydrophthalic acid anhydride and mixtures thereof; maleic or succinic acid anhydride, if desired with the concomitant use of an accelerator, such as a tertiary amine, or a strong Lewis base, as for example an alkali alcoholate or, advantageously, a polyhydroxyl compound, such as hexane triol or glycerine.

It has now been found that the hardening of the epoxide resins of this invention is advantageously performed with the use of only about 0.3 to 0.9 gram equivalent of anhydride groups per gram equivalent of epoxide groups. When a basic accelerator is used, such as an alkali alcoholate or an alkali salt of a carboxylic acid, a quantity of up to 1.0 gram equivalent of anhydride groups may be used.

The term "hardening" as used herein means the conversion of the aforementioned epoxide compounds into insoluble and infusible resins.

The invention therefore also comprises hardenable mixtures containing the diepoxides of this invention and also hardeners for epoxy resins, such as, preferably, di- or polycarboxylic acid anhydrides.

The hardenable mixtures of this invention advantageously also contain a portion of the otherwise corresponding epoxidized ethers the epoxide groups of which are wholly or partly saponified into hydroxyl groups and/or other polyhydroxyl compounds having a cross-linking action, such as hexane triol. There may of course be added to the hardenable epoxide compounds other epoxides, such as e.g., mono- or polyglycidyl ethers of monohydric or polyhydric alcohols, such as butyl alcohols, 1,4-butanediol or glycerine, or of mono or polyphenols, such as resorcinol, bis(4-hydroxyphenyl)-dimethylmethane or condensation products of aldehydes with phenols (Novolaks), furthermore, polyglycidyl esters of polycarboxylic acids, such as phthalic acid, and also aminopolyepoxides, such for examples as are obtained in the dehydrohalogenation of reaction products from epihalogenhydrins and primary or secondary amines, such as n-butylamine, aniline or 4,4'-di(-monomethylamino)-diphenylmethane.

Furthermore, the hardenable epoxide compounds or mixtures thereof with hardeners may be mixed at any stage prior to the hardening operation with fillers, softeners, coloring matter, etc. There may be used as extenders or fillers, for example, asphalt, bitumen, glass fibers, mica, quartz meal, cellulose, kaolin, finely dispersed silica (Aerosil) or metal powder.

The mixtures of epoxide compounds of this invention and hardeners can be used in the filled or unfilled state, if desired in the form of solutions or emulsions, as textile assistants, laminating resins, paints, lacquers, dipping resins, casting resins, pore filters and putties, adhesives, moulding compositions, and the like, as also for the manufacture of such products. The new resins are particularly useful as electric insulating material.

The following examples illustrate the invention, the parts and percentages being by weight unless otherwise indicated, and the parts by weight bearing the same relation to parts by volume as does the kilogram to the liter.

Example 1

A mixture of 300 parts of dicyclopentadiene and 224 parts of $\Delta^3$-tetrahydrobenzyl alcohol is heated to 125° C. and treated in the course of 30 minutes with 6 parts by volume of an ethereal solution of boron trifluoride of 48% strength. The mixture is kept at 125° C. for 48 hours, washed with saturated sodium carbonate solution, and distilled. At 181–190° C. and under a pressure of 13 mm. Hg 103 parts of 8- or 9-(tetrahydrobenzyloxy)-tricyclo-(5,2,1,0$^{2,6}$)-decene-3 pass over.

For analysis, a test portion was distilled again. Boiling point, 184° C./14 mm.; $n_D^{20}$=1.5192.

Calculated for $C_{17}H_{24}O$: C, 83.55%; H, 9.90%. Found: C, 83.6%; H, 9.9%.

145 parts of the above ether are diluted with 500 parts by volume of benzene and treated with 10 parts of anhydrous sodium acetate. While stitrring and cooling, there are added in the course of 45 minutes at about 30° C. 260 parts of peracetic acid of about 42% strength. The mixture is allowed to react for another 3 hours at 25–30° C., after which the theoretical quantity of peracetic acid is consumed. The benzene solution is washed three times with 300 parts by volume of water each time, and with 250 and 50 parts by volume of a 2 N sodium carbonate solution, then dried over sodium sulfate, filtered and evaporated.

There are obtained 153 parts of a thinly liquid diepoxide of the formula

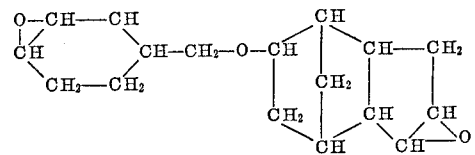

Its viscosity at 25° C. is 6200 centipoises.

Example 2

100 parts of the diepoxide prepared as described in Example 1 are melted with 48.4 parts of phthalic acid anhydride at 120–130° C., the melt poured into an aluminum mold (40 x 10 x 140 mm.) and hardened for 24 hours at 140° C. The molding has these properties:

Impact bending strength _____ cm.kg./sq. cm__ 5.8
Bending strength _____ kg./sq. mm__ 5.4
Heat distortion temperature, according to Martens _____ ° C__ 145

Example 3

A mixture of 300 parts of dicyclopentadiene and 252 parts of 6-methyl-$\Delta^3$-tetrahydrobenzyl alcohol is heated to 125° C. 6 parts by volume of 48% boron trifluoride ethyl etherate are added dropwise and the mixture maintained at about 125° C. for 24 hours. The product is diluted with 500 parts by volume of benzene, washed with 200 parts by volume of potassium bicarbonate solution saturated in the cold, dried over anhydrous sodium sulfate, filtered and evaporated. When the residue is distilled, the 6-methyl - $\Delta^3$ - tetrahydrobenzyloxydihydrodicyclopentadiene passes over at 182° C. under a pressure of 9 mm.

Analysis.—Calculated for $C_{18}H_{26}O$: C, 83.66%; H, 10.14%. Found: C, 83.45%; H, 10.11%.

50 parts of this product are diluted with 300 parts of ethyl acetate. With slight cooling, there are added dropwise at 30° C. 66 parts of an aqueous peracetic acid solution of 57% strength (containing no sulfuric acid). The mass is allowed to react while being stirred at 40° C. for 3 hours. The mixture is then diluted with 1500 parts by volume of ethyl benzene, and evaporated on the boiling water bath in a water-jet vacuum. The last traces of solvent are expelled at 100° C. in a high vacuum. There are obtained 54 parts of a liquid epoxy resin having an epoxide content of 5.65 epoxide equivalents per kg.

Example 4

380 parts of 2,5-endomethylene-$\Delta^3$-tetrahydrobenzyl-oxy-dicyclopentadiene are mixed with 1450 parts of ethyl acetate and 20 parts of anhydrous sodium acetate. In the course of half an hour, 650 parts of about 40% peracetic acid (containing also 1% of sulfuric acid, 10% of water, 3% of hydrogen peroxide, and 46% of acetic acid) are added at 50° C. The mixture is allowed to react while being stirred for 1 hour at about 45° C. After that time, the calculated quantity of peracetic acid is consumed. The mixture is diluted with 1000 parts by volume of benzene, and washed with three portions of 500 parts of water, several portions totaling 1850 parts by volume of 2 N sodium carbonate solution and 200 parts by volume of a molar sodium monophosphate solution. The solution is dried over anhydrous sodium sulfate and evaporated. The last traces of solvent are expelled in a high vacuum at 100° C. A viscous, colorless epoxy resin is obtained.

What we claim is:
1. A diepoxide compound of the formula

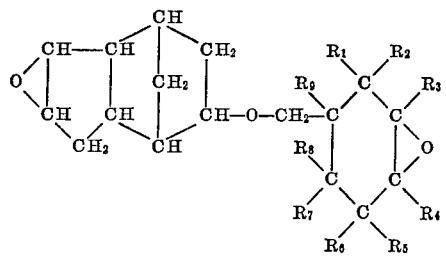

wherein $R_1$, $R_2$, $R_3$, $R_4$, $R_5$, $R_6$, $R_8$ and $R_9$ are each hydrogen, $R_7$ is a member selected from the group consisting of hydrogen and lower alkyl having 1 to 4 carbon atoms.

2. A diepoxide compound of the formula

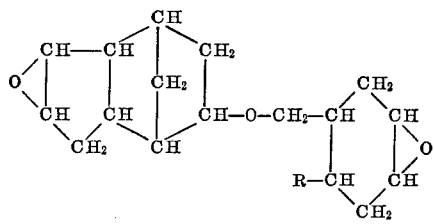

wherein R is methyl.

3. The diepoxide compound of the formula

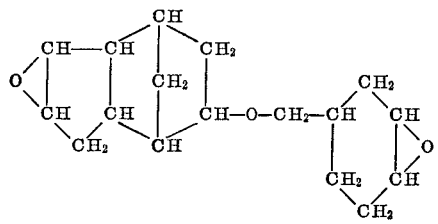

4. A compound selected from the group consisting of

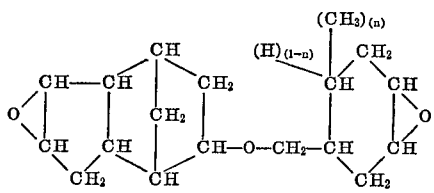

and

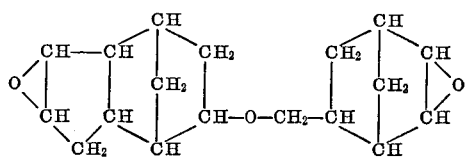

wherein $n$ has a value of 0 to 1.

References Cited

UNITED STATES PATENTS 2,543,419  2/1951  Niederhauser.
2,925,403  2/1960  Shokal.

FOREIGN PATENTS

Australian Abstract, patent appl. 62,708, Jan. 26, 1961 (1 page) 260–348C.

NORMA S. MILESTONE, *Primary Examiner.*

U.S. Cl. X.R.

260—2, 78.4, 348.5, 666, 830, 831